March 20, 1928. 1,663,402
J. ENGEL
LENS MOUNTING
Filed Oct. 9, 1925
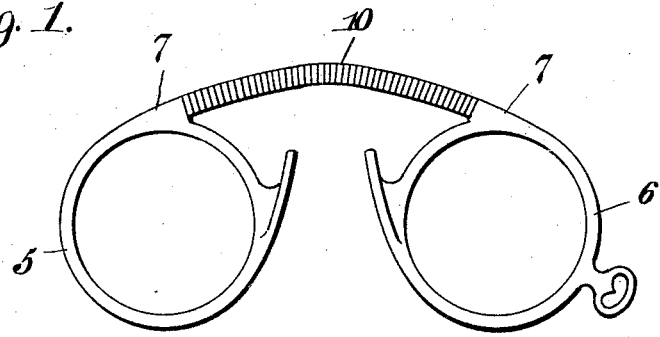
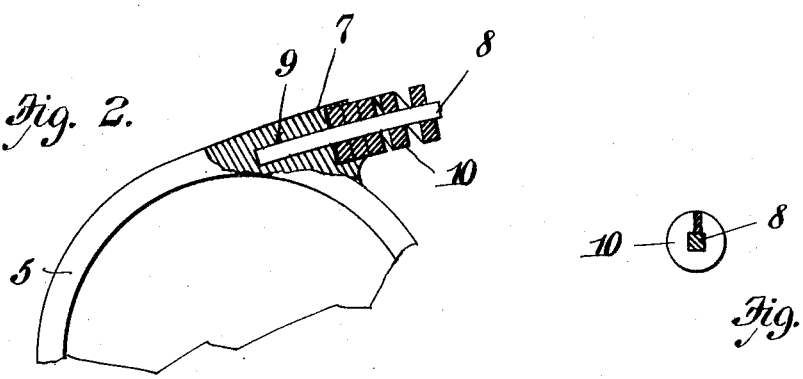
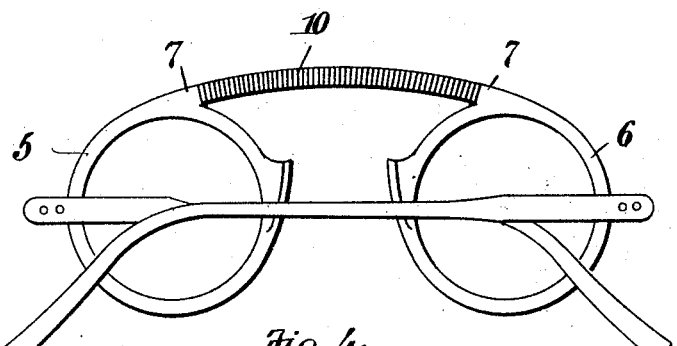
Inventor
Joseph Engel, Patented Mar. 20, 1928.

1,663,402

UNITED STATES PATENT OFFICE.

JOSEPH ENGEL, OF BROOKLYN, NEW YORK, ASSIGNOR TO SUPERLOID MANUFACTURING COMPANY, INCORPORATED, OF BROOKLYN, NEW YORK, A CORPORATION OF NEW YORK.

LENS MOUNTING.

Application filed October 9, 1925. Serial No. 61,438.

This invention relates generally to eyeglass or spectacle structure, and particularly to means for connecting lens frames with each other.

The primary object of the invention is to provide means of simplified and improved nature for connecting the lens rims and which will permit of a comparatively wide range of adjustment of the rims whereby to compensate for variations in pupillary distances.

A further object of the invention is to provide a rim connector of simple construction and which will prove durable in practice, enabling the rims to be flexible or movable with respect to each other yet which maintains the rims when once adjusted in proper relative spaced positions.

A still further object is to provide a connector of the character mentioned adaptable particularly to eyeglass and spectacle frames formed of composition material, such as zylonite, horn, celluloid, or other plastic materials or metals which enables the bridge or connector to correspond in color or tint with the rims and temples, and which will prove artistic as well as efficient in practice.

A still further object is to provide a connector of the character stated wherein the same is capable of production by simplified and improved processes, and which may be assembled expeditiously and without the exercise of unusual skill or knowledge.

With these objects in view, together with others which will appear as the description proceeds, the invention consists in the novel construction, combination and arrangement of parts, all as will be described more fully hereinafter, illustrated in the drawing, and particularly pointed out in the claims.

In the drawings:

Fig. 1 is an elevation of eyeglasses of conventional form and showing the lens rims connected in accordance with the invention, Fig. 2 is an enlarged fragmentary sectional view illustrating the manner of connecting the bridge member with one of the frames, Fig. 3 is a transverse sectional view taken through the bridge member, and Fig. 4 is a view similar to Fig. 1 and illustrating the invention as associated with spectacles.

Referring now more particularly to the drawings, 5 and 6 represent the lens frames or rims of glasses of the usual well known construction, wherein, in the present instance, these rims are formed of horn, shell, celluloid, or other plastic materials or metals, and each is provided with a boss or projection 7 through the instrumentality of which the rims are connected to each other.

The connector for the rims comprises a flexible member such as a wire or bar of metal 8, in the present instance square or rectangular in cross section, and the extremities of this bar are inserted and anchored within recesses or openings 9 formed in the bosses 7. These ends may be anchored by the use of cement or any other expedient well known in the art.

The bar or wire 8 possesses sufficient pliability to permit of the same being adjusted or flexed to bow the glasses together or apart as pupillary adjustments may require. This bar or wire is covered substantially from end to end with a flexible covering represented at 10. This covering constitutes what may be termed a cable, and comprises a tubular member having a spiral or helical cut therein throughout its length. This cut extends entirely through the body of the member to the bore thereof, so that a high degree of flexibility is obtained without danger of breaking or cracking the tubular member. The member 10 is therefore enabled to readily conform to the curvature and shape of the wire core 8 without an apparent break in the outer surface thereof. The tubing thus constructed will assume the appearance of a spirally or helically wound member tightly fitting upon the bar or wire 8, yet it possesses advantages not present in such a member, as the stretching or straining of the material incident to the winding process is obviated.

The aforesaid ends of the bosses 7 are recessed or socketed as shown more particularly in Fig. 2 of the drawings, to receive the extremities of the cable 10, and these extremities are firmly anchored in the respective bosses with the aid of glue or optician's cement.

By constructing the eyeglass bridge in the manner stated, it is apparent that the lens rims will be securely attached together, yet sufficient flexibility or pliability of the connector is present to enable variations in the distances between the frames to be made to compensate for differences in pupillary distances. The cable fits snugly and compactly upon the connecting wire, and in addition to reinforcing the same, presents a neat appearance and assists in maintaining symmetry in the eyeglass construction as well as to lend rigidity to the connector.

The cable 10 may be formed of any preferred material, such as zylonite, horn, shell, celluloid, or other plastic materials or metal, well known in the optical trade, and the color or tint of the same may correspond with that of the lens frames or may vary, as required or desired.

It is apparent that from this construction the strong and durable rim connector is provided, and one which will prove highly satisfactory both in its means of operation as well as its appearance.

Having thus described my invention, I claim:

1. In a lens mounting, a pair of rims formed of non-metallic material, a pliable wire connecting said rims, and a pliable cable upon said wire extending from end to end of the latter and secured at its ends to said rims, said cable formed of non-metallic material.

2. In a lens mounting, a pair of lens frames formed of non-metallic material, a pliable wire connecting said frames, a pliable tube formed of non-metallic material enclosing said wire from end to end and having a spiral cut coextensive therewith and the said tube secured at its ends to said frames.

3. In a lens mounting, a pair of lens frames formed of non-metallic material and having sockets therein, a wire connecting said frames and extending into said sockets, and a helical member enclosing said wire and anchored at its ends in said sockets, said helical member formed of non-metallic material.

4. In a lens mounting, a pair of lens frames formed of non-metallic material, projections on and integral with said frames having sockets in the ends thereof, a flexible member connecting said frames and extending into said sockets, and a helical member formed of non-metallic material enclosing said flexible member and anchored at its ends within said sockets.

5. In a lens mounting, a pair of lens frames formed of non-metallic material, projections integral with said frames having sockets in the ends thereof, a wire connecting said frames and extending into said sockets, and a tubular member of non-metallic material enclosing said flexible member and anchored at its extremities within said sockets, said tubular member having a spiral cut therein extending throughout the length of said tubular member.

In testimony whereof I affix my signature.

JOSEPH ENGEL.